United States Patent [19]

Brien

[11] Patent Number: 5,471,395
[45] Date of Patent: Nov. 28, 1995

[54] CONTROL OF CNC MACHINE TOOLS

[75] Inventor: Glenn C. Brien, Harkaway, Australia

[73] Assignee: Anca Pty. Ltd., Bayswater North, Australia

[21] Appl. No.: 157,091

[22] PCT Filed: Jun. 4, 1992

[86] PCT No.: PCT/AU92/00260

§ 371 Date: Dec. 3, 1993

§ 102(e) Date: Dec. 3, 1993

[87] PCT Pub. No.: WO92/22024

PCT Pub. Date: Dec. 10, 1992

[30] Foreign Application Priority Data

Jun. 4, 1991 [AU] Australia ................................. PK6494

[51] Int. Cl.[6] .................................................. G06F 19/00
[52] U.S. Cl. ................................ 364/474.28; 318/568.19; 364/474.36; 395/86; 395/97
[58] Field of Search ......................... 364/474.28, 474.22, 364/474.35, 474.36, 191–193; 395/86, 87, 92, 97, 98, 99; 318/568.1, 568.13, 568.14, 568.19; 901/3–5, 41

[56] References Cited

U.S. PATENT DOCUMENTS

| | | | |
|---|---|---|---|
| 3,321,072 | 5/1967 | Alsys | 206/46 |
| 3,909,600 | 9/1975 | Hohn | 364/193 X |
| 3,920,972 | 11/1975 | Corwin, Jr. et al. | 364/193 X |
| 4,381,608 | 5/1983 | Thormann et al. | 33/1 M |
| 4,591,771 | 5/1986 | Nozawa et al. | 318/569 |
| 4,705,451 | 11/1987 | Mori et al. | 395/86 |
| 4,811,235 | 3/1989 | Shiriakata | 364/474.3 |
| 4,920,500 | 4/1990 | Hetland et al. | 364/193 X |
| 5,053,975 | 10/1991 | Tsuchihashi et al. | 395/99 |
| 5,053,976 | 10/1991 | Nose et al. | 395/86 |
| 5,129,044 | 7/1992 | Kashigawi et al. | 395/86 |
| 5,129,045 | 7/1992 | Stelzer et al. | 395/87 |

*Primary Examiner*—Joseph Ruggiero
*Attorney, Agent, or Firm*—Keck, Mahin & Cate

[57] ABSTRACT

A multi-axis computer numerically controlled (CNC) machine tool is provided in which a cutting tool (7) is movable relative to a workpiece (6) by means of a number of linear and rotary joints ($J^1$ to $J^3$) under the control of a programmable control unit (1). The machine is programmed with a plurality of principal programmable axes, called "hard" axes (X, Z and B), and with at least one synthesized additional programmable axis or "soft" axis (V) which enables the cutting tool (7) to be moved linearly in the direction of the soft axis (V) without requiring a specific joint for that purpose. The synthesized "soft" axis is a non-collinear, partially redundant axis which increases the number of programmable degrees of freedom to a greater number than the machine degrees of freedom ie: the number of non-collinear joints. The principle of synthesizing "soft" axes may be extended to CNC machine tools having four or more principal hard axes, for instance, to produce a 5-joint CNC machine tool which has the flexibility of a conventional 7- or 8-joint machine tool.

22 Claims, 7 Drawing Sheets

CONTROL OF CNC MACHINE TOOLS

This invention relates to multi-axis computer numerically controlled (CNC) machine tools in which a cutting tool is movable relative to a workpiece under the control of programmable control means including a computer program known as a "part program".

As used herein the term "cutting tool" refers to the portion of the machine that is designed to act upon the workpiece to perform the desired task. In the context of this invention, the cutting tool is not restricted to standard turning or milling cutters, but also includes all mechanical, electronic and/or electro-mechanical devices used to modify the shape and/or properties of the workpiece. Examples of cutting tools include: end-mills, turning tools, grinding wheels, laser cutting beams, plasma beams and punch tools.

Multi-axis CNC machine tools conventionally include a plurality of movable machine members and a plurality of controllable joints movable to cause the cutting tool to move relative to a fixed frame of reference (eg. the machine base). The workpiece may be mounted on workpiece mounting means which is fixed relative to the machine base. Alternatively, the workpiece may be mounted on workpiece mounting means connected to the machine base by further movable machine members and controllable joints.

The joints of a multi-axis machine tool may include prismatic (linear) joints which enable a machine part to be moved in a linear direction and rotary joints which enable a machine part to be rotated about a rotary axis. The programmable control means of a multi-axis CNC machine tool is conventionally programmed to control the position and orientation of the joints to cause the cutting tool to occupy a desired position and orientation relative to the workpiece mounting means.

The term multi- or multiple axis control, when used in the context of CNC machine tools, conventionally refers to a form of CNC control in which the machine may be programmed to control one or more joints concurrently. The development of multi-axis and multifunction machine tools in conjunction with the development of sophisticated computer controlled operations has facilitated the emergence of a generation of very high speed precision machine tools capable of complex multi-step operations from one machine.

In programming a CNC machine tool with multi-axis control a plurality of programmable positioning directions or "axes" are chosen which constitute the minimum number of axes required to position the cutting tool relative to the workpiece. These programmable axes, referred to herein as principal programmable axes may include up to three linear orthogonal axes and one or more rotary axes.

Conventionally, a CNC machine tool has a number of programmable axes and is controlled by part program which serially instructs the machine to perform a sequential series of discrete operations in a predetermined or programmed sequence.

In simple CNC machine tools, the number of joints of the machine is often equal to the number of programmable axes. For instance, a four axis machine tool may have three orthogonal linear or prismatic joints providing control of movement in three orthogonal directions (X, Y and Z), and one rotary joint providing rotation about a rotary axis A. In programming such a four axis machine, the directions X, Y and Z may conveniently be chosen as programmable linear axes and the axis A chosen as a programmable rotary axis.

U.S. Pat. No. 4,591,771 discloses a numerical control system for a five axis CNC machine tool of the type having three linear or prismatic joints controlled by servo motors which provide relative movement between the tool and the workpiece in the directions of the X, Y and Z axes of an orthogonal co-ordinate system and two rotary joints controlled by servo motors which provide rotary movement in the directions of B and C axes of a spherical co-ordinate system. In programming the five axis machine of U.S. Pat. No. 4,591,771 the orthogonal axes X, Y and Z and the rotary axes B and C may be conveniently chosen as programmable axes.

The five axis CNC machine of U.S. Pat. No. 4,591,771 also includes a manual pulse generator which allows the machine tool to be moved manually in the axial direction A of the machine tool relative to the workpiece to increase or decrease the cutting amount.

Conventional four or five axis CNC machines, such as the five axis machine of U.S. Pat. No. 4,591,771, can thus be programmed to carry out simple linear movements of the machine tools using the programmable linear axes (X, Y and Z) and to carry out rotary movements in the directions of the programmable rotary axes (eg. B and C) which are located by rotary joints. However, such conventional CNC machine tools cannot automatically move along or contour around axes other than the four or five programmable axes without more complicated programming using a combination of the programmable axes or unless the other axes are located by means of further prismatic or rotary joints under the control of the part program.

It is therefore desirable to provide a method of operating a multi-axis CNC machine tool wherein the cutting tool can move automatically along or contour around an axis without requiring physical location of that axis by means of a prismatic or rotary joint.

It is also desirable to provide a multi-axis CNC tool having a certain number of joints and which is able to control movement of a cutting tool automatically relative to a workpiece in a plurality of linear axis directions and around at least one rotary axis direction without requiring at least as many joints as the number of linear and rotary axis directions.

In accordance with one aspect of the present invention there is provided a method of operating a multi-axis CNC machine tool having workpiece mounting means for mounting a workpiece, a cutting tool operable upon said workpiece, a plurality of machine members and a plurality of controllable joint means movable under the control of a program to cause relative movement between the cutting tool and the workpiece mounting means, said method comprising the steps of programming the machine with a plurality of principal programmable positioning directions or axes which axes constitute the minimum number of axes required to position the cutting tool relative to the workpiece mounting means, and programming the machine to control movement of the joint means in accordance with a part program so as to cause the cutting tool to move along a programmed path relative to the workpiece mounting means, the method being characterized by the step of programming the machine to synthesize at least one additional programmable axis whereby relative movement of said cutting tool and said workpiece mounting means is automatically controllable in relation to said additional programmable axis in accordance with said part program without physical location of said additional programmable axis by joint means.

In accordance with another aspect of the invention there is provided a multi-axis CNC machine tool comprising:

workpiece mounting means for mounting a workpiece thereon;

a cutting tool movable relative to the workpiece mounting means;

a plurality of machine members; and a plurality of controllable joint means movable to cause the relative movement between said cutting tool and said workpiece mounting means; and programmable control means programmed to control automatically the position and orientation of said plurality of joint means in accordance with a part program;

the machine tool having a plurality of principal programmable positioning directions or axes which constitute the minimum number of programmable axes required to position and orientate the cutting tool relative to the workpiece mounting means;

characterized in that the machine is programmed to synthesize at least one additional programmable axis, whereby movement of said cutting tool or said workpiece mounting means in relation to said at least one additional programmable axis is automatically controllable in accordance with said part program without physical location of said at least one synthesized additional programmable axis by joint means.

The CNC machine may be programmed to synthesize more than one additional programmable axis, allowing movement of the cutting tool or the workpiece in relation to each one of the additional programmable axes to be controlled without physical location of said synthesized additional programmable axes. The or each synthesized additional programmable axis may be hereinafter referred to as a "soft axis", with the principal programmable axes being referred to as "principal hard axes".

Preferably, at least one of said synthesized additional programmable axes or "soft" axes is non-collinear with the principal programmable axes. Hitherto, in programming conventional multi-axis machine tools, such non-collinear axes would be regarded as partially redundant axes since it is possible to describe any required position or orientation of the cutting tool relative to the workpiece in terms of co-ordinates of the principal "hard" axes. A soft axis which is collinear with one of the other soft axes may be regarded as a fully redundant axis, although it will be appreciated that the present invention in its broadest form includes the synthesis by electronic or computational means of any "soft" axis, whether it is partially redundant or fully redundant.

Soft axes are fully programmable axes capable of simulating normal axis operations such as: interpolation, contouring, splicing, offsetting, jogging, manual positioning and live offset positioning.

Conventionally, at least one of said synthesized additional programmable axes or soft axes is arranged to pass through a part of the cutting tool and to remain fixed relative to the cutting tool. The synthesis of such a soft axis enables the machine to be programmed to control linear movement of a rotatable cutting tool either along a soft axis coinciding with the axis of rotation of the cutting tool or to control the cutting tool to contour around a soft rotary axis, for instance an axis passing through a grinding point at the edge of the cutting tool.

It will be appreciated that the synthesis of soft axes can increase the number of programmable axes to exceed the total number of joints in a multi-axis CNC machine. In this case it is possible, for instance, to provide a four or five axis machine tool having four or five joints which can function as effectively as conventional machine tools having six or more joints.

Some preferred embodiments of the present invention will now be described, by way of example only, with reference to the accompanying drawings in which.

The principle of using synthesized partially redundant axes in a CNC machine tool to reduce the number of joints required to move a cutting tool may be described with reference to FIGS. 1 and 2 of the drawings.

Figure 1:
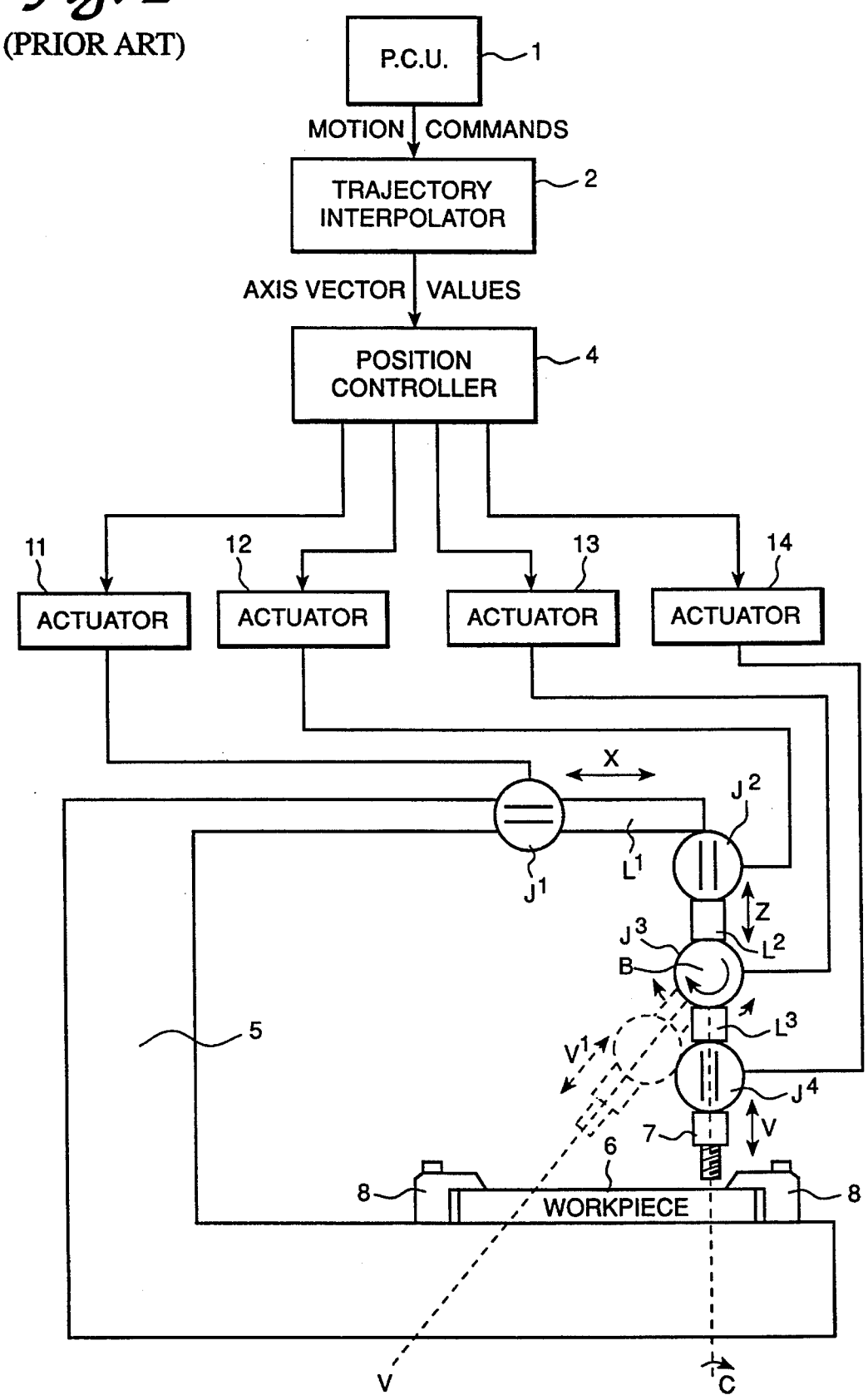
FIG. 1 is a schematic diagram of a simple prior art CNC machine tool having four "hard" axes and four joints.

The CNC machine tool illustrated schematically in FIG. 1 is a simple, conventional machine tool comprising a programmable control unit or PCU 1, a trajectory interpolator 2, a position controller 4, a machine base 5 having mounting means 8 for mounting a workpiece 6 thereon, a rotatable cutting tool 7, a plurality of movable machine members $L^1$ to $L^3$, a plurality of joints $J^1$–$J^4$ and a respective actuator 11 to 14 associated with each joint $J^1$–$J^4$.

As shown schematically in FIG. 1, the first joint $J^1$ is a linear or prismatic joint forming a telescopic linkage between a part of the machine base 5 and the first machine member $L^1$ and providing movement of machine member $L^1$ relative to the base 5 in a horizontal direction X, the second joint $J^2$ is a linear or prismatic joint forming a telescopic linkage between the first machine member $L^1$ and the second machine member $L^2$, and providing relative linear movement between the first and second machine members $L^1$ and $L^2$ in a vertical direction Z, the third joint $J^3$ is a rotary joint between the second and third machine members $L^2$ and $L^3$ and providing angular movement of the third machine member $L^3$ relative to the second machine member $L^2$ about a rotary axis B, and the fourth joint $J^4$ is a linear or prismatic joint forming a telescopic linkage between the third machine member $L^3$ and the head of the cutting tool 7 providing linear movement of the cutting tool 7 relative to the third machine member $L^3$ in a direction V coinciding with the axis of rotation of the rotatable cutting tool 7.

In conventional terms a machine tool such as that of FIG. 1 is often referred to as a "four axis machine" because it has four joints $J^1$ to $J^4$. The machine is also considered to have four machine degrees of freedom (MDOF) because it has four non-collinear joint axes or directions in which relative movement between adjacent machine members or between the cutting tool and the third machine member may take place, ie: linear axes X, Z and V and rotary axis B. However, in the context of the present invention, the CNC machine tool of FIG. 1 is considered to have three principal axes, known as principal "hard" axes, ie: orthogonal linear axes X and Z and rotary axis B. Linear axis V is known as a partially redundant "hard" axis, since any change in linear position of the cutting tool 7 in the V direction relative to the workpiece 6 could be expressed in terms of the change in co-ordinates of the X and Z axes. Conventionally, in programming the CNC machine of FIG. 1 to control movement of the cutting tool 7 in accordance with a programmed path, the program would define the relative positions of the joints $J^1$ to $J^4$ and the movable machine members $M^1$ to $M^3$ relative to a point of reference on the fixed workpiece known as the workpiece reference point in terms of coordinates from the X, Z and B principal "hard" axes and the partially redundant "hard axis" V. Thus, the number of programming degrees of freedom (PDOF) in the machine of FIG. 1 is four, equal to the number of machine degrees of freedom (MDOF), ie. the number of Joints.

Figure 2:
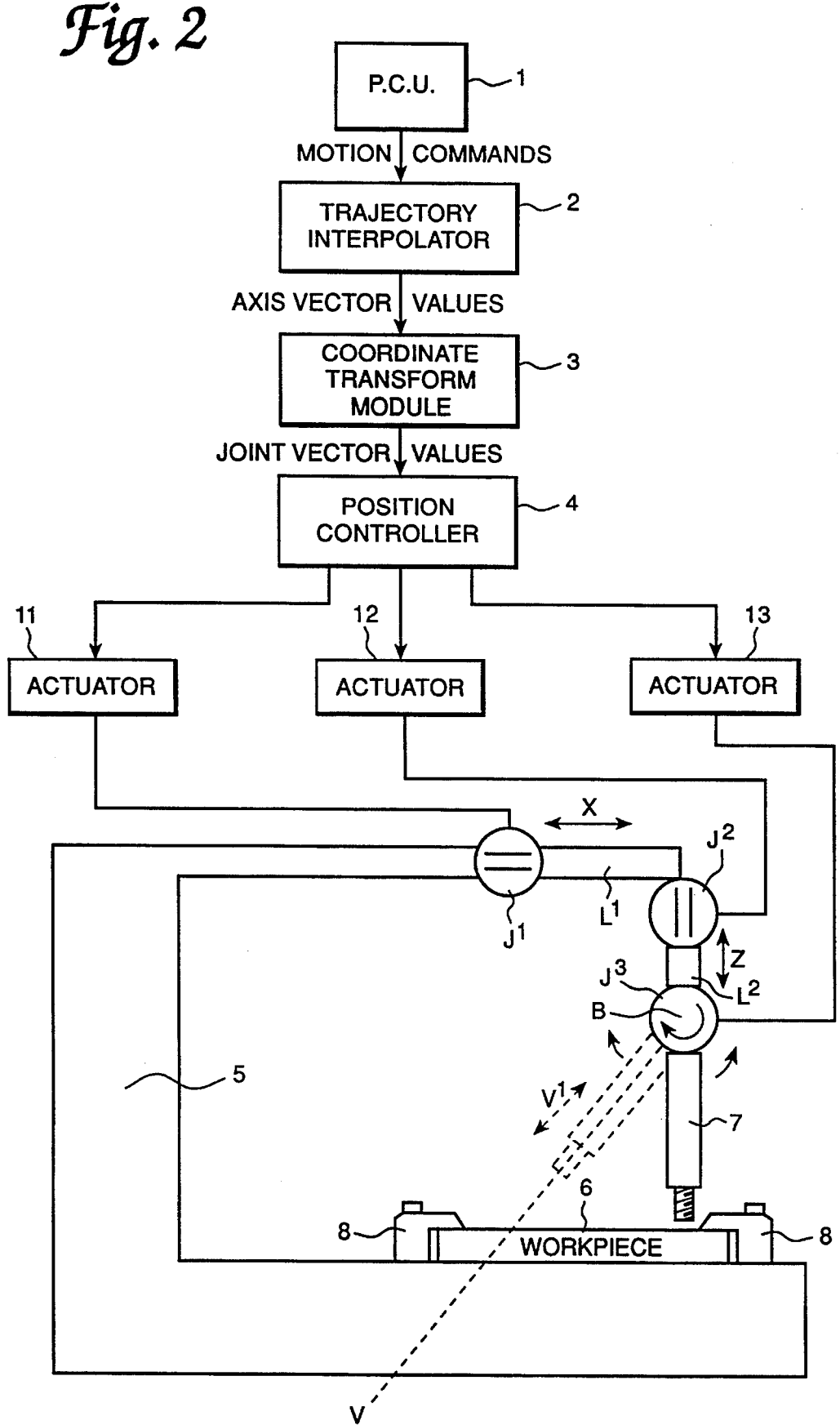
FIG. 2 is a schematic diagram of a simple CNC machine tool in accordance with the invention having three principal "hard" axes, a partly redundant "soft" axis and three joints.

The machine tool illustrated schematically in FIG. 2 is similar to that of FIG. 1 and corresponding reference numerals have been applied to corresponding parts. The machine tool of FIG. 2, however, differs physically from that of FIG. 1 in that the third machine member $L^3$, the fourth joint $J^4$ and its associated actuator 14 have been omitted. Also, in contrast to FIG. 1, the machine tool of FIG. 2 includes a co-ordinate transform module 3 and, by suitable programming of the PCU 1 and the co-ordinate transform module 3, is able to control movement of the cutting tool 7 relative to the workpiece reference point in the same linear directions X, Z and V and about the same rotary axes B and C as the machine tool of FIG. 1 despite the fact that there is no physical location of linear axis V by means of a joint since joint $J^4$ has been omitted.

In accordance with the present invention, the three joint machine of FIG. 2 is able to position the cutting tool relative to the workpiece as effectively as the four joint machine of FIG. 1 because the co-ordinate transform module 3 is programmed to synthesize a partially redundant "soft" axis corresponding to linear axis V which passes through the cutting tool 7. It will be appreciated that linear movement of the cutting tool 7 in the direction V' is possible by appropriate actuation of prismatic joints $J^1$ and $J^2$ without physically locating the linear axis V by means of a corresponding joint $J^4$. Since the machine has only three joints, $J^1$, $J^2$, and $J^3$ it only has three machine degrees of freedom (MDOF) but because an additional partially redundant "soft" axis is synthesized, the machine has four programming degrees of freedom (PDOF). In this manner, the three joint or three axis machine of FIG. 2 can operate in the same way as the four joint machine of FIG. 1.

The manner in which a CNC machine tool is programmed to synthesize one or more "soft" axes will be described with particular reference to FIG. 3 which shows a co-ordinate transform module 3 of a machine having five joints $J^1$ to $J^5$, five principal "hard" axes and two partially redundant "soft" axes. First, however, it is necessary to define various terms and some axis classification rules as follows:

Definitions

Cutting Tool

The cutting tool is the portion of the machine that is designed to act upon a workpiece to perform the desired task. In the context of this patent, the cutting tool is not restricted to standard turning or milling cutters, but also includes all mechanical, electronic and/or electro-mechanical devices used to modify the shape and/or properties of the workpiece. Examples of cutting tools include: end-mills, turning tools, grinding wheels, laser cutting beams, plasma beams and punch tools.

Workpiece

The workpiece is the part upon which useful work is done by the machine tool. The principal job of the machine tool is to modify a workpiece's shape and/or properties.

Workpiece Reference Point (WRP)

The workpiece reference point (WRP) is a point of reference, logically attached to the workpiece. It is located as a fixed position relative to the workpiece but this position may be programmed be means other than using axes.

Machine Member

A machine member is an essentially rigid mechanical structure of the machine tool or a combination of mechanical structures that result in a mathematically constant link between 2 joints $J^n$ and $J^{n+1}$ or between the base of the machine and joint $J^1$ or between joint $J^N$ and the cutting tool (where N is the number of joints in the machine tool).

Last Machine Member

The last machine member is the machine member that attaches joint $J^N$ to the cutting tool where N is the number of joints in the machine tool.

Joint

A mechanical linkage between two machine members. A joint is controlled by means of an actuator. The position of a joint describes the kinematic relationship between one machine member and another. In most implementations, each joint position maps directly and simply to the position of one actuator. In some implementations, a simple N to N mapping occurs between joint positions and actuator positions however, this is rare for most normal machine tools.

Actuator

Active mechanism used to power a joint. Typical actuators are electrical servo motors, pneumatic and hydraulic pistons.

Tool Reference Point (TRP)

The tool reference point (TRP) is a point of reference, logically attached to the last machine member of the machine tool. It is located as a fixed position relative to the last machine member but this position may be programmed be means other than using axes.

Rotating Cutting Tool

A rotating cutting tool is a cutting tool designed to spin about a particular axis, whereby useful work is done by the swept volume of the cutting tool. This implies that the orientation of the cutting tool is limited to 2 degrees of freedom; the third degree of freedom (rotation about the spinning axis) has no meaning.

Spacial Degrees of Freedom (SDOF)

A machine tool can be defined as having SDOF spacial degrees of freedom and ODOF orientation degrees of freedom. The spacial degrees of freedom (SDOF) of a machine tool is an integral number that represents the fundamental space that the machine tool is designed to operate in. This space is called SDOF-Dimensional Euclidean Space which may be defined as a rectangular coordinate system with SDOF euclidean dimensions embedded in the workpiece at the workpiece reference point. This reference frame and its corresponding euclidean space are used herein as the base frame when referencing the position and orientation of the machine tool.

The number of SDOF will be one of:
0. For a purely rotational machine (eg: carousal).
1. For a fundamentally 1 dimensional machine (eg: conveyor belt).
2. For a fundamentally 2 dimensional machine (eg: conventional lathe).

3. For a fundamentally 3 dimensional machine conventional knee mill).

This value must be viewed with reference to the orientation degrees of freedom (ODOF).

SDOF is defined as the minimum number of Euclidean space dimensions required to fully describe the set of fundamental axis direction vectors for all linear axes and the set of fundamental axis direction vectors for all rotary axes for all axis vector values within the working envelope of the machine tool.

ie: If the position of the tool reference point relative to the workpiece reference point is always constrained in 1 dimension then SDOF=1; in 2 dimensions then SDOF=2; in 3 dimensions SDOF=3.

Orientation Degrees of Freedom (ODOF)

The orientation degrees of freedom (ODOF) of a machine tool is an integral number that represents the fundamental degrees of freedom that the orientation of the cutting tool may make with respect to the workpiece.

More specifically, given that the tool reference point is in contact with the workpiece reference point, ODOF is the number of different direction vectors $D^n$ (maximum of 3) (each of which is orthogonal to all other $D^m$) about which the cutting tool may be programmed to rotate (using the rotary axes and linear axes) for all axis vector values within the working envelope of the machine tool for which the tool reference point remains in contact with the workpiece reference point.

This definition does not imply that the cutting tool cannot be rotated about more than ODOF direction axes over the entire working envelope. It refers to the number of degrees of rotary freedom given a fixed position of the tool reference point with respect to the workpiece reference point. At a different position (or in a different programmed configuration) the cutting tool may rotate about a different direction vector.

The number of ODOF will be one of:

0. For machines where the cutting tool cannot be pivoted with respect to the workpiece.
1. For machines where the cutting tool can be pivoted about only one direction vector with respect to the workpiece (eg: a 4 axis knee mill; with rotary workpiece axis).
2. For machines where the cutting tool can be pivoted about two direction vectors with respect to the workpiece (eg: a conventional 5 axis mill).
3. For machines where the cutting tool can be pivoted about three direction vectors with respect to the workpiece (eg: a conventional 6 axis robot). Note: a 5 axis mill has ODOF=2 even if it is fitted with a rotary workpiece axis as this axis is not orthogonal to the 2 tool pivoting axes. To create a mill with ODOF=3, a rotary axis parallel to the normal tool spindle rotation direction would need to be provided (which is capable of performing useful work with normal tooling).

NOTES:

1. A rotary axis designed to rotate the workpiece can not be used in the calculation of ODOF and SDOF. It is counted either as an axis used to effect principal positioning of the tool reference point with respect to the workpiece reference point (eg: theta in a cylindrical coordinate position system) or as an axis used to effect principal orientation of the tool reference point with respect to the workpiece reference point.
2. A machine with a rotating tool may have a maximum ODOF=2 since there can be no distinction of tool orientation along the axis of tool rotation.

Axis

In the context of this patent, an axis is a "programmable" positioning direction. The principal means of programming a CNC to position the machine tool to a particular position is to specify the destination point as a set of axis positions. Typical names for axes are: X, Y, Z, A, B, C, U, X1, X2, A3 etc. Axes may be either linear axes or rotary axes. For descriptive purposes in this patent, axes are represented as $A^n$ where n represents the location of the axis in the axis vector.

Axis Position

The axis position of an axis (say $A^n$) is the value that the axis has been programmed to reach after all programmed transformations have been accounted for.

Axis Vector

An axis vector ($\underline{A}$) is a vectorial representation of the position of the machine tool expressed as a column matrix (M+1×1) where each element of the vector represents the axis position of one of the M axes of the machine tool. The last element in the vector is the value 1. This is used for homogeneity of the vector:

$$\underline{A} = \begin{bmatrix} a^1 \\ a^2 \\ \cdot \\ \cdot \\ a^M \\ 1 \end{bmatrix}$$

where: $a^i$ represents the position of axis i.

NOTE: Whilst $\underline{A}$ is referred to as an axis vector, it bears no direct relationship to a normal 3-dimensional Euclidean space vector.

Position Matrix

The position matrix ($\underline{\underline{P}}$) is a representation that combines the position of the tool reference point (TRP) in SDOF-dimensional euclidean space (with respect to the workpiece reference point (WRP)) with the orientation of the cutting tool (with respect to SDOF-dimensional euclidean space). $\underline{\underline{P}}$ can be represented as follows:

$$\underline{\underline{P}} = \begin{bmatrix} \underline{N} & \underline{O} & \underline{A} & \underline{P} \\ 0 & 0 & 0 & 1 \end{bmatrix}$$

where:

$\underline{N}$ is called the normal orientation vector (see below).

$\underline{O}$ is called the orient orientation vector (see below).

$\underline{A}$ is called the approach orientation vector (see below).

$\underline{P}$ is called the position vector (see below).

The vectors $\underline{N}$, $\underline{O}$ and $\underline{A}$ described above are called orientation vectors. They form an orthogonal set of unit vectors, whose values (in SDOF-dimensional euclidean space) represent the orientation of the cutting tool with respect to the workpiece. This set of vectors can encompass up to 3 orientation degrees of freedom (which is the maximum allowed). These vectors can be defined as follows:

$$\underline{N} = \begin{bmatrix} N_x \\ N_y \\ N_z \end{bmatrix} \quad \underline{O} = \begin{bmatrix} O_x \\ O_y \\ O_z \end{bmatrix} \quad \underline{A} = \begin{bmatrix} A_x \\ A_y \\ A_z \end{bmatrix}$$

where:

$N_x$ is the $\underline{i}$ axis position of the vector $\underline{N}$ in SDOF-dimensional euclidean space.

$N_y$ is the $\underline{j}$ axis position of the vector $\underline{N}$ in SDOF-dimensional euclidean space.

$N_z$ is the $\underline{k}$ axis position of the vector $\underline{N}$ in SDOF-dimensional euclidean space.

similarly for $O_x$, $O_y$, $O_z$, $A_x$, $A_y$, and $A_z$.

Axis Matrix

The axis matrix ($\underline{\underline{A}}$) is a symbolic 4×4 matrix that defines the kinematic relationship between the position matrix ($\underline{\underline{P}}$) and the axis position of each of the axes ($a^n$); which are the elements of the axis vector ($\underline{A}$). The elements of $\underline{\underline{A}}$ are expressed symbolically in terms of $a^n_{(or\ n-1\ \ldots\ N)}$ where N is the number of axes in the machine tool. $\underline{\underline{A}}$ is defined as:

$$\underline{\underline{A}} = \begin{bmatrix} f_{11}(\underline{A}) & f_{12}(\underline{A}) & f_{13}(\underline{A}) & f_{14}(\underline{A}) \\ f_{21}(\underline{A}) & f_{22}(\underline{A}) & f_{23}(\underline{A}) & f_{24}(\underline{A}) \\ f_{31}(\underline{A}) & f_{32}(\underline{A}) & f_{33}(\underline{A}) & f_{34}(\underline{A}) \\ 0 & 0 & 0 & 1 \end{bmatrix}$$

where:

$f_{ij}(\underline{A})$ is a function of the components of $\underline{A}$ ($a^x$, $a^2$ ... $a^N$)

$\underline{\underline{A}}$ satisfies the following equation:

$$\underline{\underline{P}}(\underline{A}) = \underline{\underline{A}}(\underline{A})$$

for all values of $\underline{A}$ within the working envelope of the machine tool.

Linear Axis

An axis is a linear axis if, for all current axis vector ($\underline{A}'$) values within the working envelope of the machine tool, the following equations are true:

$$\underline{\underline{P}}(\underline{A}' + [0 \ldots \Delta a^n \ldots 1]^T) - \underline{\underline{P}}(\underline{A}') + \underline{\underline{K}} \Delta a^n \cdot \left( \frac{\partial}{\partial a^n} \underline{\underline{P}} \right)(\underline{A}')$$

$$\left( \frac{\partial}{\partial a^n} \underline{N} \right)(\underline{A}') - \left( \frac{\partial}{\partial a^n} \underline{O} \right)(\underline{A}') - \left( \frac{\partial}{\partial a^n} \underline{A} \right)(\underline{A}') - \begin{bmatrix} 0 \\ 0 \\ 0 \end{bmatrix}$$

where: $\underline{\underline{P}} = \begin{bmatrix} \underline{N} & \underline{O} & \underline{A} & \underline{P} \\ 0 & 0 & 0 & 1 \end{bmatrix} - A$ where:

$a^n$ is the component direction of the axis vector corresponding to $A^n$.

$\Delta a^n$ is a scalar representing the displacement of axis $A^n$ from the axis position at $\underline{A}'$.

$\underline{A}'$ is the current axis vector.

$\underline{\underline{A}}$ is the axis matrix.

$\underline{\underline{P}}$ is the position matrix.

$\underline{P}$ is the position vector (see the definition of position matrix).

$\underline{N}$, $\underline{O}$ and $\underline{A}$ are the orientation vectors (see the definition of position matrix).

K is a scalar constant for all $\underline{A}'$ and all $\Delta a^n$.

Rotary Axis

A rotary axis is an axis that causes the orientation of the cutting tool (with respect to SDOF-dimensional euclidean space) to change. A rotary axis satisfies at least one of the following criteria:

either $\left( \frac{\partial}{\partial a^n} \underline{N} \right)(\underline{A}') \ne [0\ 0\ 0]^T$ or $\left( \frac{\partial}{\partial a^n} \underline{O} \right)(\underline{A}') \ne [0\ 0\ 0]^T$ or $\left( \frac{\partial}{\partial a^n} \underline{A} \right)(\underline{A}') \ne [0\ 0\ 0]^T$ where: $\underline{\underline{P}} = \begin{bmatrix} \underline{N} & \underline{O} & \underline{A} & \underline{P} \\ 0 & 0 & 0 & 1 \end{bmatrix} = \underline{\underline{A}}$ where:

$a^n$ is the component rotation of the axis vector corresponding to $A^n$.

$\underline{A}'$ is the current axis vector.

$\underline{\underline{A}}$ is the axis matrix.

$\underline{\underline{P}}$ is the position matrix.

$\underline{P}$ is the position vector (see the definition of position matrix).

$\underline{N}$, $\underline{O}$ and $\underline{A}$ are the orientation vectors (see the definition of position matrix).

for all $\underline{A}'$ within the working envelope of the machine tool.

Collinear Axes (linear)

Two or more linear axes are defined as being collinear if they satisfy the following criteria:

The fundamental axis direction vectors ($\underline{D}^n_a(\underline{A}')$) of the axes form a collinear set of vectors for all axis vector values within the working envelope of the machine tool. ie: A linear axis (say $A^n$) is collinear to another linear axis ($A^m$) if the direction of movement of $A^n$ always coincides with the direction of movement of $A^m$ regardless of the position of the machine tool. This is expressed in the following equation:

$$\underline{D}_a^n(\underline{A}') = K \cdot \underline{D}_a^m(\underline{A}')$$

where:

K is a scalar constant.

for all current axis vector values $\underline{A}'$ within the working envelope of the machine tool.

A third axis ($A^p$) is collinear to $A^n$ if it is collinear to $A^n$. Note: This definition does not imply that the fundamental axis direction vectors of a collinear axis set are constant. It only relates to the relative linear dependence of the set.

Current Axis Vector

The current axis vector ($\underline{A}'$) is the value of the axis vector $\underline{A}$ at the current position of the machine tool.

Fundamental Axis Direction Vector

The fundamental axis direction vector ($\underline{D}_a^n(\underline{A}')$) for a linear axis $A^n$ is defined as the vector that relates the rate of change of the position of the tool reference point (with respect to the workpiece reference point) in SDOF-dimensional euclidean space to the rate of change in the position of $A^n$ at the current axis vector. It is represented by the solution of the partial differential equation at the current axis vector:

$$D_a^n(\underline{A'}) = \left( \frac{\partial}{\partial a^n} \underline{\underline{P}} \right)(\underline{A'})$$

$$\text{where: } \underline{\underline{P}} = \begin{bmatrix} \underline{N} & \underline{O} & \underline{A} & \underline{P} \\ 0 & 0 & 0 & 1 \end{bmatrix} = \underline{\underline{A}}$$

where:
$a^n$ is the component direction of the axis vector corresponding to $A^n$.
$\underline{A'}$ is the current axis vector.
$\underline{\underline{A}}$ is the axis matrix.
$\underline{\underline{P}}$ is the position matrix.
$\underline{P}$ is the position vector (see the definition of position matrix)
$\underline{N}, \underline{O}$ and $\underline{A}$ are the orientation vectors (see the definition of position matrix).

Collinear Axes (rotary)

Two or more rotary axes are defined as being collinear if they satisfy the following criteria:

The fundamental axis rotation vectors ($\underline{R}_a^n(\underline{A'})$) of the axes form a collinear set of vectors for all axis vector values within the working envelope of the machine tool and the fundamental axis rotation origin vectors ($\underline{V}_a^n(\underline{A'})$) of the axes are identical for all axis vector values within the working envelope of the machine tool. ie: A rotary axis (say $A^n$) is collinear to another rotary axis ($A^m$) if the direction of rotation of $A^n$ always coincides with the direction of rotation of $A^m$ and the origin of rotation of $A^n$ is always the same as the origin of rotation of $A^m$ regardless of the position of the machine tool. This is expressed in the following equations:

$$\underline{R}_a^n(\underline{A'}) = K \cdot \underline{R}_a^m(\underline{A'})$$

$$\underline{V}_a^n(\underline{A'}) = \underline{V}_a^m(\underline{A'})$$

where:
K is the scalar constant 1 or −1.
for all current axis vector values $\underline{A'}$ within the working envelope of the machine tool, A third axis ($A^p$) is collinear to $A^m$ if it is collinear to $A^n$.
Note: This definition does not imply that the fundamental axis rotation vectors or fundamental axis rotation origin vectors of a collinear axis set are constant, It only relates to the relative linear dependence and equality of the set.

Fundamental Axis Rotation Origin Vector

The fundamental axis rotation origin vector ($\underline{V}_a^n(\underline{A'})$) for the rotary axis $A^n$ defines the instantaneous location of the axis of rotation of $A^n$ in SDOF-dimensional euclidean space at the current axis vector ($\underline{A'}$). It is defined by the following equation:

$$\underline{V}_a^n(\underline{A'}) = \underline{P}(\underline{A'}) + \left( \underline{R}_a^n(\underline{A'}) \times \left( \frac{\partial}{\partial a^n} \underline{P} \right)(\underline{A'}) \right)$$

$$\text{where: } \underline{\underline{P}} = \begin{bmatrix} \underline{N} & \underline{O} & \underline{A} & \underline{P} \\ 0 & 0 & 0 & 1 \end{bmatrix} = \underline{\underline{A}}$$

where:
$a^n$ is the component rotation of the axis vector corresponding to $A^n$,
$\underline{A'}$ is the current axis vector,
$\underline{\underline{A}}$ is the axis matrix,
$\underline{\underline{P}}$ is the position matrix,
$\underline{P}$ is the position vector (see the definition of position matrix).
$\underline{N}, \underline{O}$ and $\underline{A}$ are the orientation vectors (see the definition of position matrix).
$\underline{R}_a^n(\underline{A'})$ is the axis rotation vector for $A^n$.

Fundamental Axis Rotation Vector The fundamental axis rotation-vector ($\underline{R}_a^n(\underline{A'})$) for the rotary axis $A^n$ is defined as the unit vector that relates the rate of change in the orientation vectors ($\underline{N}, \underline{O}$ and $\underline{A}$) (see the definition of position matrix) to the rate of change of the axis position of $A^n$ at the current axis vector. It defines the instantaneous direction of rotation of $A^n$ about which, a change in the axis position $a^n$ will cause the cutting tool to rotate. $\underline{R}_a^n(\underline{A'})$ is defined by following equation set:

$$\underline{R}_a^n(\underline{A'}) = K_1 \cdot \left( \underline{N}(\underline{A'}) \times \left( \frac{\partial}{\partial a^n} \underline{N} \right)(\underline{A'}) \right)$$

$$\underline{R}_a^n(\underline{A'}) = K_2 \cdot \left( \underline{O}(\underline{A'}) \times \left( \frac{\partial}{\partial a^n} \underline{O} \right)(\underline{A'}) \right)$$

$$\underline{R}_a^n(\underline{A'}) = K_3 \cdot \left( \underline{A}(\underline{A'}) \times \left( \frac{\partial}{\partial a^n} \underline{A} \right)(\underline{A'}) \right)$$

$$|\underline{R}_a^n(\underline{J'})| = 1$$

$$\text{where: } \underline{\underline{P}} = \begin{bmatrix} \underline{N} & \underline{O} & \underline{A} & \underline{P} \\ 0 & 0 & 0 & 1 \end{bmatrix} = \underline{\underline{A}}$$

where:
$a^n$ is the component rotation of the axis vector corresponding to $A^n$.
$\underline{A'}$ is the current axis vector.
$\underline{\underline{A}}$ is the axis matrix.
$\underline{\underline{P}}$ is the position matrix.
$\underline{P}$ is the position vector (see the definition of position matrix).
$\underline{N}, \underline{O}$ and $\underline{A}$ are the orientation vectors (see the definition of position matrix).
$K_i$ are scalar constants.

Collinear Axis Set

A set of axes, each of which is collinear to every other axis in the set. There may be multiple collinear axis sets for a particular machine tool.

Non-Collinear Axis

A non-collinear axis is an axis that cannot be placed in any collinear sets of axes.

Programming Degrees of Freedom

In the context of this patent, the programming degrees of freedom (PDOF) of a machine tool is an integral number that represents the number of non-collinear axes plus the number of collinear axis sets.

Working Envelope

The working envelope is defined as the complete family of values that the position matrix (P) is able to acquire for the machine tool. This family of values will be dependent on the spacial degrees of freedom and the orientation degrees of freedom and any limits applied to axis positions and joint positions.

Joint Position

For prismatic joints, the joint position ($j^n$) is expressed as a linear displacement in units of millimetres. For rotary joints, the joint position ($j^n$) is expressed as an angular position in units of radians.

The units expressed above are for definition to correspond to the equations stated. Real applications may have units different to these (eg: encoder counts). Appropriate scaling of the equations is then in order.

Joint Vector

A joint vector ($\underline{J}$) is a vectorial representation of the position of the machine tool expressed as a column matrix (N+1×1) where each element of the vector represents the joint position of one of the N joints of the machine tool. The last element in the vector is the value 1. This is used for homogeneity of the vector:

$$\underline{J} = \begin{bmatrix} j^1 \\ j^2 \\ \cdot \\ \cdot \\ j^n \\ 1 \end{bmatrix}$$

where:

$j^1$ represents the position of joint i.

NOTE: Whilst $\underline{J}$ is referred to as a joint vector, it bears no direct relationship to a normal 3-dimensional Euclidean space vector.

Current Joint Vector

The current joint vector ($\underline{J}'$) is the value of the joint vector $\underline{J}$ at the current position of the machine tool.

Joint Matrix

The joint matrix ($\overline{\overline{J}}$) is a symbolic 4×4 matrix that defines the kinematic relationship between the position matrix ($\overline{\overline{P}}$) and the joint position of each of the joints ($j^n$); which are the elements of the joint vector ($\underline{J}$). The elements of $\overline{\overline{J}}$ are expressed symbolically in terms of $j^n_{(for\ n=1\ ...\ N)}$ where N is the number of joints in the machine tool. $\overline{\overline{J}}$ is defined as:

$$\overline{\overline{J}} = \begin{bmatrix} f_{11}(\underline{J}) & f_{12}(\underline{J}) & f_{13}(\underline{J}) & f_{14}(\underline{J}) \\ f_{21}(\underline{J}) & f_{22}(\underline{J}) & f_{23}(\underline{J}) & f_{24}(\underline{J}) \\ f_{31}(\underline{J}) & f_{32}(\underline{J}) & f_{33}(\underline{J}) & f_{34}(\underline{J}) \\ 0 & 0 & 0 & 1 \end{bmatrix}$$

where:

$f_{ij}(\underline{J})$ is a function of the components of $\underline{J}$ ($j^1, j^2 \ldots j^N$).

$\overline{\overline{J}}$ satisfies the following equation:

$$\overline{\overline{P}}(\underline{J}) = \overline{\overline{J}}(\underline{J})$$

for all values of $\underline{J}$ within the working envelope of the machine tool.

Prismatic Joint

A joint is a prismatic joint if, for all current joint vector ($\underline{J}'$) values within the working envelope of the machine tool, the following equations are true:

$$\underline{P}(\underline{J}' + [0 \ldots \Delta j^n \ldots 1]^T) = \underline{P}(\underline{J}') + K\Delta j^n \cdot \left( \frac{\partial}{\partial a^n}\ \underline{P}\ \right)(\underline{J}')$$

$$\left( \frac{\partial}{\partial a^n}\ \underline{N}\ \right)(\underline{J}') = \left( \frac{\partial}{\partial j^n}\ \underline{O}\ \right)(\underline{J}') = \left( \frac{\partial}{\partial j^n}\ \underline{A}\ \right)(\underline{J}') = \begin{bmatrix} 0 \\ 0 \\ 0 \end{bmatrix}$$

where: $\overline{\overline{P}} = \begin{bmatrix} \underline{N} & \underline{O} & \underline{A} & \underline{P} \\ 0 & 0 & 0 & 1 \end{bmatrix} = \overline{\overline{J}}$ where:

$j^n$ is the component direction of the joint vector corresponding to $J^n$.

$\Delta j^n$ is a scalar representing the displacement of joint $J^n$ from the joint position at $\underline{J}'$.

$\underline{J}'$ is the current joint vector.

$\overline{\overline{J}}$ is the joint matrix.

$\overline{\overline{P}}$ is the position matrix.

$\underline{P}$ is the position vector (see the definition of position matrix).

$\underline{N}$, $\underline{O}$ and $\underline{A}$ are the orientation vectors (see the definition of position matrix).

K is a scalar constant.

for all $\underline{J}'$ and all $\Delta j^n$.

Joint Displacement Vector

The joint displacement vector ($\underline{D}^n(\underline{J}')$) for the prismatic joint $J^n$ is defined as the vector that relates the rate of change of the position of the tool reference point in SDOF-dimensional euclidean space (with respect to the workpiece reference point) to the rate of change in the position of $J^n$ at the current joint vector. It is represented by the solution of the partial differential equation at the current joint vector:

$$\underline{D}^n(\underline{J}') = \left( \frac{\partial}{\partial j^n}\ \underline{P}\ \right)(\underline{J}')$$

where: $\overline{\overline{P}} = \begin{bmatrix} \underline{N} & \underline{O} & \underline{A} & \underline{P} \\ 0 & 0 & 0 & 1 \end{bmatrix} = \overline{\overline{J}}$ where:

$j^n$ is the component direction of $\underline{J}$ corresponding to $J^n$.

$\underline{J}'$ is the current joint vector.

$\overline{\overline{J}}$ is the joint matrix.

$\overline{\overline{P}}$ is the position matrix.

$\underline{P}$ is the position vector (see the definition of position matrix).

$\underline{N}$, $\underline{O}$ and $\underline{A}$ are the orientation vectors (see the definition of position matrix).

Rotary Joint

A rotary joint is a joint that causes the orientation of the cutting tool (with respect to SDOF-dimensional euclidean space) to change. A rotary joint satisfies at least one of the following criteria:

either $\left( \frac{\partial a}{\partial j^n}\ \underline{N}\ \right)(\underline{J}') \neq [0\ 0\ 0]^T$ or $\left( \frac{\partial}{\partial j^n}\ \underline{O}\ \right)(\underline{J}') \neq [0\ 0\ 0]^T$ or $\left( \frac{\partial}{\partial a^n}\ \underline{A}\ \right)(\underline{J}') \neq [0\ 0\ 0]^T$ where: $\overline{\overline{P}} = \begin{bmatrix} \underline{N} & \underline{O} & \underline{A} & \underline{P} \\ 0 & 0 & 0 & 1 \end{bmatrix} = \overline{\overline{J}}$ where:

$j^n$ is the component rotation of the joint vector corresponding to $J^n$.

$\underline{J}'$ is the current joint vector.

$\underline{\underline{J}}$ is the joint matrix.

$\underline{\underline{P}}$ is the position matrix.

$\underline{\underline{P}}$ is the position vector (see the definition of position matrix).

$\underline{N}$, $\underline{O}$ and $\underline{A}$ are the orientation vectors (see the definition of position matrix).

for all $\underline{J}'$ within the working envelope of the machine tool.

Joint Rotation Vector

The joint rotation vector ($\underline{R}^n(\underline{J}')$) for the rotary joint $J^n$ is defined as the unit vector that relates the rate of change in the orientation vectors ($\underline{N}$, $\underline{O}$ and $\underline{A}$) (see the definition of position matrix) to the rate of change of the joint position of $J^n$ at the current joint vector. It defines the instantaneous direction of rotation of $J^n$ about which, a change in the joint position $j^n$ will cause the cutting tool to rotate. $\underline{R}^n(\underline{J}')$ is defined by following equation set:

$$\underline{R}^n(\underline{J}') = K_1 \cdot \left( \underline{N}(\underline{J}') \times \left( \frac{\partial}{\partial j^n} \underline{N} \right)(\underline{J}') \right)$$

$$\underline{R}^n(\underline{J}') = K_2 \cdot \left( \underline{O}(\underline{J}') \times \left( \frac{\partial}{\partial j^n} \underline{O} \right)(\underline{J}') \right)$$

$$\underline{R}^n(\underline{J}') = K_3 \cdot \left( \underline{A}(\underline{J}') \times \left( \frac{\partial}{\partial j^n} \underline{A} \right)(\underline{J}') \right)$$

$$|\underline{R}^n(\underline{J}')| = 1$$

where: $\underline{\underline{P}} = \begin{bmatrix} \underline{N} & \underline{O} & \underline{A} & \underline{P} \\ 0 & 0 & 0 & 1 \end{bmatrix} = \underline{\underline{J}}$ where:

$j^n$ is the component rotation of $\underline{\underline{J}}$ corresponding to $J^n$.

$\underline{J}'$ is the current joint vector.

$\underline{\underline{J}}$ is the joint matrix.

$\underline{\underline{P}}$ is the position matrix.

$\underline{\underline{P}}$ is the position vector (see the definition of position matrix).

$\underline{N}$, $\underline{O}$ and $\underline{A}$ are the orientation vectors (see the definition of position matrix).

$K_i$ are scalar constants.

Joint Rotation Origin Vector

The joint rotation origin vector ($\underline{V}^n(\underline{J}')$) for the rotary joint $J^n$ defines the instantaneous location of the axis of rotation of $J^n$ in SDOF-dimensional euclidean space at the current joint vector ($\underline{J}'$). It is defined by the following equation:

$$\underline{V}^{899p}(\underline{J}') + \left( \underline{R}^n(\underline{J}') \times \left( \frac{\partial}{\partial j^n} \underline{P} \right)(\underline{J}') \right)$$

where: $\underline{\underline{P}} = \begin{bmatrix} \underline{N} & \underline{O} & \underline{A} & \underline{P} \\ 0 & 0 & 0 & 1 \end{bmatrix} = \underline{\underline{J}}$ where:

$j^n$ is the component rotation of $\underline{\underline{J}}$ corresponding to $J^n$.

$\underline{J}'$ is the current joint vector.

$\underline{\underline{J}}$ is the joint matrix.

$\underline{\underline{P}}$ is the position matrix.

$\underline{\underline{P}}$ the position vector (see the definition of position matrix).

$\underline{N}$, $\underline{O}$ and $\underline{A}$ are the orientation vectors (see the definition of position matrix).

$\underline{R}^n(\underline{J}')$ is the joint rotation vector for $J^n$.

Collinear Joints (prismatic)

Two or more prismatic joints are defined as being collinear if they satisfy the following criteria:

The joint displacement vectors ($\underline{D}^n(\underline{J}')$) of the joints form a collinear set of vectors for all joint vector values within the working envelope of the machine tool. ie: A prismatic joint (say $J^n$) is collinear to another prismatic joint ($J^m$) if the direction of movement of $J^n$ always coincides with the direction of movement of $J^m$ regardless of the position of the machine tool. This is expressed in the following equation:

$$\underline{D}^n(\underline{J}') = K \cdot \underline{D}^m(\underline{J}')$$

where: K is a scalar constant. for all current joint vector values $\underline{J}'$ within the working envelope of the machine tool.

A third joint ($J^p$) is collinear to $J^m$ if it is collinear to $J^n$. Note: This definition does not imply that the joint displacement vectors of a collinear joint set are constant. It only relates to the relative linear dependence of the set.

Collinear Joints (rotary)

Two or more rotary joints are defined as being collinear if they satisfy the following criteria:

The joint rotation vectors ($\underline{R}^n(\underline{J}')$) of the joints form a collinear set of vectors for all joint vector values within the working envelope of the machine tool and the joint rotation origin vectors ($\underline{V}^n(\underline{J}')$) of the joints are identical for all joint vector values within the working envelope of the machine tool. ie: A rotary joint (say $J^n$) is collinear to another rotary joint ($J^m$) if the direction of rotation of $J^n$ always coincides with the direction of rotation of $J^n$ and the origin of rotation of $J^n$ is always the same as the origin of rotation of $J^n$ regardless of the position of the machine tool. This is expressed in the following equations:

$$\underline{R}^n(\underline{J}') = K \cdot \underline{R}^m(\underline{J}')$$

$$\underline{V}^n(\underline{J}') = \underline{V}^m(\underline{J}')$$

where: K is the scalar constant 1 or −1. for all current joint vector values $\underline{J}'$ within the working envelope of the machine tool.

A third joint ($J^p$) is collinear to $J^m$ if it is collinear to $J^n$. Note: This definition does not imply that the joint rotation vectors or joint rotation origin vectors of a collinear joint set are constant. It only relates to the relative linear dependence and equality of the set.

Collinear Joint Set

A set of joints, each of which is collinear to every other joint in the set. There may be multiple collinear joint sets for a particular machine tool.

Non-Collinear Joint

A non-collinear joint is a joint that cannot be placed in any collinear sets of joints.

Fully Redundant Joint

A fully redundant joint is a joint that can be included in a collinear set of joints. The inclusion of a fully redundant joint in a CNC does not add to the machine degrees of freedom (MDOF).

Machine Degrees of Freedom

In the context of this patent, the machine degrees of freedom (MDOF) of a machine tool is an integral number that represents the number of non-collinear joints plus the number of collinear joint sets.

Axis Classification Rules

A CNC machine tool will have at least (SDOF+ODOF) axes. These axes can be classified as follows:

Principal Hard Axes

A selection of the machine tool's axes is made such that this set of axes constitutes the minimum number of axes required to position the tool reference point with respect to the workpiece reference point to any position defined within SDOF-dimensional euclidean space and thereafter to rotate the cutting tool about the tool reference point in ODOF orthogonal directions. The axes in this set are called "principal hard axes". There may be multiple sets of axes that satisfy this criterion, however one of these sets must be chosen in order to differentiate between hard axes and soft axes. The selection of this set will have no bearing on the number of soft axes of a machine tool.

Partially Redundant Axis

A linear axis (say $A^n$) is a partially redundant axis if it is a non-collinear axis and satisfies all of the following criteria:
1. $A^n$ is not classified as a principal hard axis under the axis classification rules.
2. The fundamental axis direction vector of $A^n$ can be define in SDOF-dimensional euclidean space for all axis vector values within the working envelope of the machine tool.

A rotary axis (say $A^n$) is a partially redundant axis if it is a non-collinear axis, is not classified as a principal hard axis under the axis classification rules and satisfies one of the following criteria:
1. The fundamental axis rotation vector of $A^n$ is collinear to the fundamental axis rotation vector of one of the rotary axes $A^m$ classified as a principal hard axis for all axis vector values within the working envelope of the machine tool but the fundamental axis rotation origin vectors for $A^n$ and $A^m$ are not identical for all axis vector values within the working envelope or the machine tool.
2. The fundamental axis rotation vector of $A^n$ is collinear to the axis of rotation of a rotating cutting tool for all axis vector values within the working envelope of the machine tool.

A partially redundant axis does not add to the spacial degrees of freedom or the orientation degrees of freedom of the machine tool. ie: the position of the tool reference point with respect to the workpiece reference point or the orientation of the cutting tool cannot be modified be means of a partially redundant axis in a way that could not otherwise be done by utilizing the machine's other axes. Note: this definition does not concern the axis vector or the joint vector. It only concerns the relative position and orientation of the cutting tool with respect to the workpiece.

Fully Redundant Axis

A fully redundant axis is an axis that can be included in a collinear set of axes. The inclusion of a fully redundant axis in a CNC does not add to the programming degrees of freedom (PDOF).

Fully Redundant Hard Axes

An axis of the machine tool that is a fully redundant axes and is a collinear axis to one or more principal hard axes but is not a principal hard axes is called a "fully redundant hard axis".

Partially Redundant Hard Axes

A selection of the machine tool's axes (called the set of "partially redundant hard axes") that are neither principal hard axes nor fully redundant hard axes is made such that the set of hard axes (if no other axes were provided) would cause the programmed degrees of freedom (PDOF) to equal the machine degrees of freedom (MDOF) and that the number of axes in the set of partially redundant hard axes is the maximum possible. This implies that if axis $A^n$ is a collinear axis to $A^n$ and $A^m$ is included in this set, then $A^n$ is also included in this set. There may be multiple sets of axes that satisfy these criteria, however one of these sets must be chosen in order to differentiate between partially redundant hard axes and soft axes. The selection of this set will have no bearing on the number of soft axes of a machine tool.

Soft Axes

An axis of the machine tool that is not a hard axis is called a "soft axis". The set of soft axes may include partially redundant axes and fully redundant axes. If an axis $A^n$ is a fully redundant axis and is a collinear axes to $A^n$ and $A^n$ is a soft axis, then $A^n$ is also a soft axis. Soft axes increase PDOF to a number that is greater than MDOF. Given a machine tool with N axes, if the number of hard axes is H and the number of soft axes is S (S=N-H), the values of S, N and H do not change, regardless of how the axes are classified according to the above rules even though the actual axes that are assigned the classification "soft axis" may be different depending on how the classification sets are chosen.

Hard Axes

Hard axes are thus defined as the set of axes that includes all of the axes classified as either; principal hard axes, fully redundant hard axes or partially redundant hard axes via the axis classification rules.

NOTES:
1. In this specification, the machine tool, its axes, joints, geometry and kinematics are Considered as being precisely mathematically modelled: Misalignments and nonlinearities inherent in any "real world" implementation do not effect the fundamental definitions and claims of this patent.
2. Axes and joints are considered within this specification as having unlimited travel.
3. Definitions relating to spacial and orientation degrees of freedom must be considered at axis vector and joint vector values that result in the maximum possible values of these. The fact that some axis vector or joint vector values correspond to a reduction in spacial or orientation degrees of freedom due to the instantaneous alignment of 2 or more axes (or joints) that are not part of the same collinear set or because 1 or more axes (or joints) is restricted due to physical, electrical or computer imposed limits is not relevant.
4. The definitions herein consider machine tools with axes and joints designed to have one workpiece reference point and one tool reference point. For machines designed to have multiple concurrent workpiece reference points and/or multiple tool reference points, these definitions should be considered for each logical pair of workpiece reference point and tool reference point.
5. The descriptions herein of axis and joint positions and orientations do not consider any clearance or other constraints that may be imposed by the practical application of a machine tool to a specific job.

Referring to FIG. 2, the programmable control unit (PCU) 1 contains a part program which determines the programmed path along which the cutting tool 7 is programmed to move when the machine tool is operating in automatic mode. The PCU 1 interprets the part program and passes high level motion command signals to the trajectory interpolator 2. The trajectory interpolator 2 processes the high level motion commands to produce axis vector values $\underline{A}$ at a rate of one axis vector value every machine update period (on average). The trajectory interpolator 2 may also process, in known manner, feedrate specification signals representing an automatic feedrate for the speed of movement of the cutting tool along the programmed path. A novel form of trajectory interpolator which also processes an MPG feed specification from a manual pulse generator (MPG) in automatic mode is described in our co-pending International Application, PCT/AU92/00259 corresponding to U.S. Ser. No. 08/157,033 entitled "Improvements in or relating to Computer Numerically Controlled Machines", the disclosure of which is incorporated herein by reference.

The axis vector values from the trajectory interpolator 2 are input sequentially to the co-ordinate transform module 3 as current axis vector values $\underline{A}'$. The co-ordinate transform module 3 performs calculations based on the current axis vector, the machine's axis matrix A and the machine's joint matrix J in order to produce a joint vector $\underline{J}'$. This joint vector $\underline{J}'$ (called the current joint vector) is then output as a signal from the co-ordinate transform module 3 and input to the position controller 4. The position controller 4 then controls the actuators 11, 12 and 13 to move the joints $J^1$ to $J^3$, machine members $L^1$ and $L^2$ to cause the cutting tool 7 to occupy the desired position on the programmed path.

Figure 3:
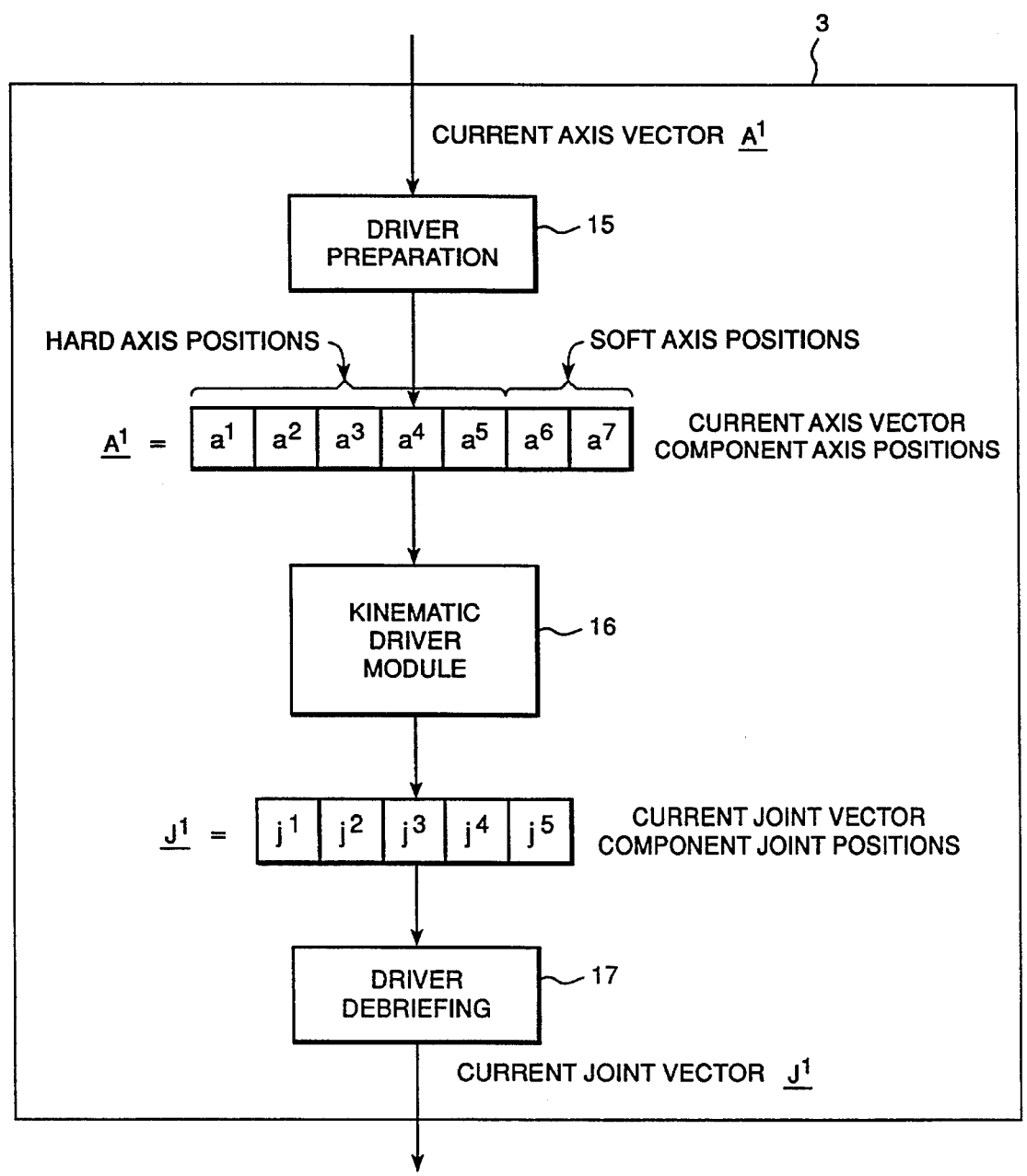
FIG. 3 is a block diagram of a co-ordinate transform module for a CNC machine tool in accordance with the invention having five principal "hard" axes, two "soft" axes and five joints.

Referring to FIG. 3 of the drawings, there is shown a co-ordinate transform module 3 for a CNC machine tool having five principal "hard" axes, two partially redundant "soft" axes, and five joints.

The co-ordinate transform module shown in FIG. 3 comprises a programmable module 3 and includes a driver preparation module 15, a kinematic driver module 16 and a driver debriefing module 17. The driver preparation module 15 sequentially receives signals representing the current axis vector $\underline{A}'$ and prepares and passes each signal to the kinematic driver module in the form of component axis positions $a^1$ to $a^7$, where $a^1$ to $a^5$ represent component axis positions of the five principal "hard" axes, and $a^6$ and $a^7$ represent component axis positions of the two "soft" axes. The "soft" axes, as defined above, are partially redundant axes or fully redundant axes that have been synthesized by electronic or computational means of the CPU, with the kinematic driver module 16 also being programmed with encoded mathematical kinematic equations of the particular machine tool in terms of both "hard" and "soft" axis positions. This module can be replaced for different machine tools so that the kinematics can be customized for each type of machine tool.

The kinematic driver module 16 may perform the transformation from a current axis vector value $\underline{A}'$ to a joint vector value $\underline{J}'$ by means of two procedural sections. The first section calculates a numerical value for the position matrix $\underline{\underline{P}}(\underline{A}')$ at the current axis vector based on the axis matrix $\underline{\underline{A}}$: The second section uses equations of the form:

$$j^n = f_n(\underline{\underline{P}})$$

where:

$f_n(\underline{\underline{P}})$ is a function of the components of the position matrix $\underline{\underline{P}}$, for each component joint position $j^n$, derived from the equation:

$$\underline{\underline{P}} = \underline{\underline{J}}$$

where: J is the joint matrix and P is the position matrix, to calculate the joint positions $j^n$ from the numerical value for P calculated from the first section. These two sections may be combined into one stage (in simple kinematic machines) where the equations can be represented as:

$$j^n = f_n(\underline{A})$$

where: $\underline{A}$ is the axis vector and $f_n(\underline{A})$ is a function of the components of $\underline{A}$ ($a^1, a^2 \ldots a^M$) where M is the number of axes of the machine tool.

In the co-ordinate transform module illustrated in FIG. 3, the kinematic driver module 16 transforms the current axis vector $\underline{A}'$ with seven component axis positions $a^1$ to $a^7$ into a current joint vector $\underline{J}'$ having five component joint positions $j^1$ to $j^5$ each of which corresponds to one of the five joints $J^1$ to $J^5$ of the machine tool.

The current joint vector $\underline{J}'$ then passes through the driver debriefing module 17 before being passed to the actuators for the respective joints $J^1$ to $J^5$ of the machine.

It will thus be appreciated that the present invention introduces a coordinate transform module which completely detaches the coordinate system(s) that the programmer uses from the joint space coordinate system that the position controller uses. This allows greater flexibility in the equations that map the programming coordinates (axes) to joints. In particular, the kinematic driver module allows the value of soft axes to be included in the axis vector value passed to the coordinate transform module. Using the axis matrix, joint matrix and position matrix value allows the correct joint vector to be calculated that satisfies the axis vector, even though the axis vector contains redundant information (the soft axis position values).

The present invention also provides the significant advantage that a CNC machine in accordance with the invention requires less joints than a conventional machine to perform the same function as the conventional machine. For instance, whilst this invention is not limited to a CNC machine having a particular number of joints and soft axes, preferred embodiments of this invention include a 7 axis CNC tool grinder which contains 5 joints; a 6 axis CNC cylindrical grinder which contains 4 joints; an 8 axis CNC laser cutter that contains 5 joints and an 8 axis CNC milling machine that contains 5 joints. These preferred embodiments will be described with reference to FIGS. 4 to 8 of the drawings.

Figure 4:
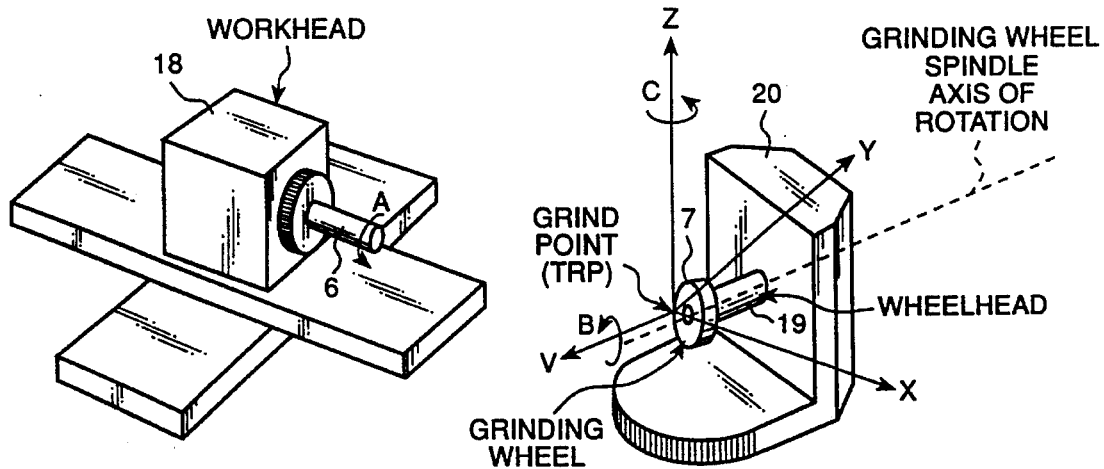
FIG. 4 is a perspective view of the workpiece and grinding wheel of a CNC tool grinder having five principal "hard" axes, two "soft" axes and five joints.
Figure 5:
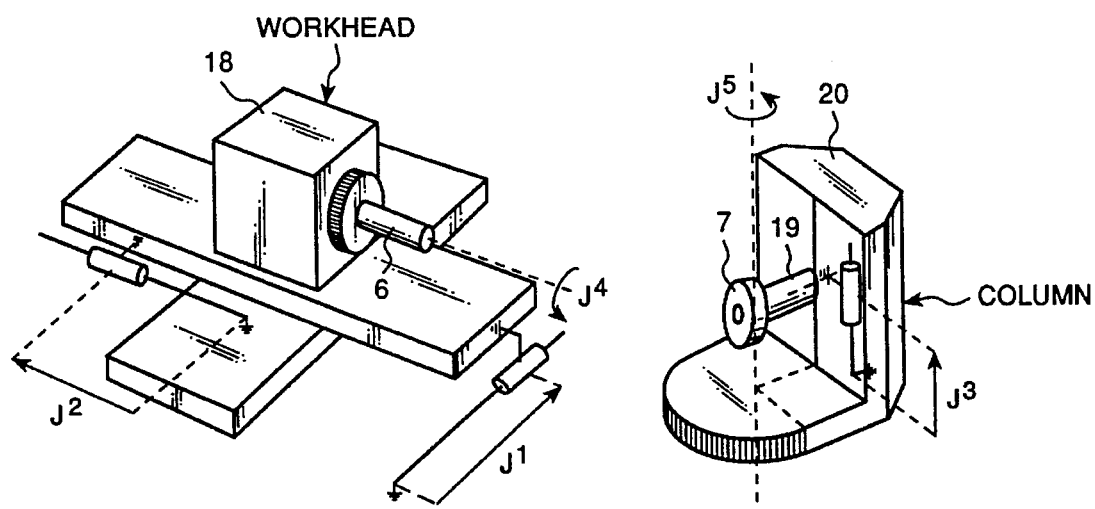
FIG. 5 is a perspective view showing the joint layout for the CNC tool grinder of FIG. 4.

Referring to FIGS. 4 and 5, there is shown the workhead 18 and wheelhead 19 of a CNC tool grinder having 5 hard axes and 2 soft axes to provide the programmability and flexibility of a full 7 axis machine with the added advantage of full contouring facilities on all axes whist requiring only 5 joints.

In the embodiment of FIGS. 4 and 5, the workpiece 6 is rotatably carried by the workhead 18 which itself is linearly movable in the directions of axes X and Y by means of prismatic joints $J^1$ and $J^2$ which connect the workhead 18 to the base of the machine (not shown).

The wheelhead 19 carries on one end a rotating cutting tool 7 in the form of a grinding wheel, and the other end of the wheelhead 19 is connected to a column 20 by a prismatic joint $J^3$ which permits vertical movement of the wheelhead 19 relative to the column 20 in the direction of axis Z. The machine also includes two rotary joints $J^4$ and $J^5$. Rotary joint $J^4$ permits rotation of the workpiece about a horizontal rotary axis A and rotary joint $J^5$ permits rotation of the column about a vertical rotary axis C.

The axis layout in FIG. 4 of the machine may be chosen according to the axis selection rules as:

---

Hard Axes

X   Linear axis (left/right).
Y   Linear axis (fore/aft).
Z   Linear axis (up/down).

-continued

| | |
|---|---|
| A | Rotary axis (horizontal rotation of workhead) |
| C | Rotary axis (vertical rotation of wheelhead) |
| Soft Axes | |
| B | Rotary axis (grind point (tool reference point: TRP) location on grinding wheel) |
| V | Linear axis (parallel to grinding wheel spindle axis of rotation). |

The joint layout for this machine is depicted in FIG. 5:

| | |
|---|---|
| $J^1$ | Prismatic joint (left/right linear slide) |
| $J^2$ | Prismatic joint (fore/aft linear slide) |
| $J^3$ | Prismatic joint (up/down linear slide) |
| $J^4$ | Roatary joint (horizontal rotation of workhead) |
| $J^5$ | Rotary joint (vertical rotation of column) |

As can be seen from FIG. 3, the spacial degrees of freedom of this machine SDOF=3. The orientation degrees of freedom ODOF=2. Since this machine contains a rotating cutting tool, ODOF cannot equal 3. Axes X, Y and Z are 3 orthogonal linear axes, selected as principal hard axes under the axis classification rules to provide the SDOF positional degrees of freedom. None of the axes are collinear axes, so we are free to select 2 of the 3 rotary axes as principal hard axes. A and C are arbitrarily chosen to be principal hard axes under the axis classification rules to provide the ODOF orientation degrees of freedom. The remaining 2 axes B and V, thus are classified as soft axes. The programming degrees of freedom is thus PDOF=SDOF+ODOF+2=7. The machine degrees of freedom MDOF=number of non-collinear joints= 5.

Therefore, by appropriate selection and synthesis of soft axes B and V, the machine tool can be programmed to control relative movement between the workpiece and cutting tool either in the direction of linear axis V or about rotary axis B. This movement would conventionally require a 7-axis machine with specific joints to control movement in the direction of linear axis V or about rotary axis B.

Figure 6:
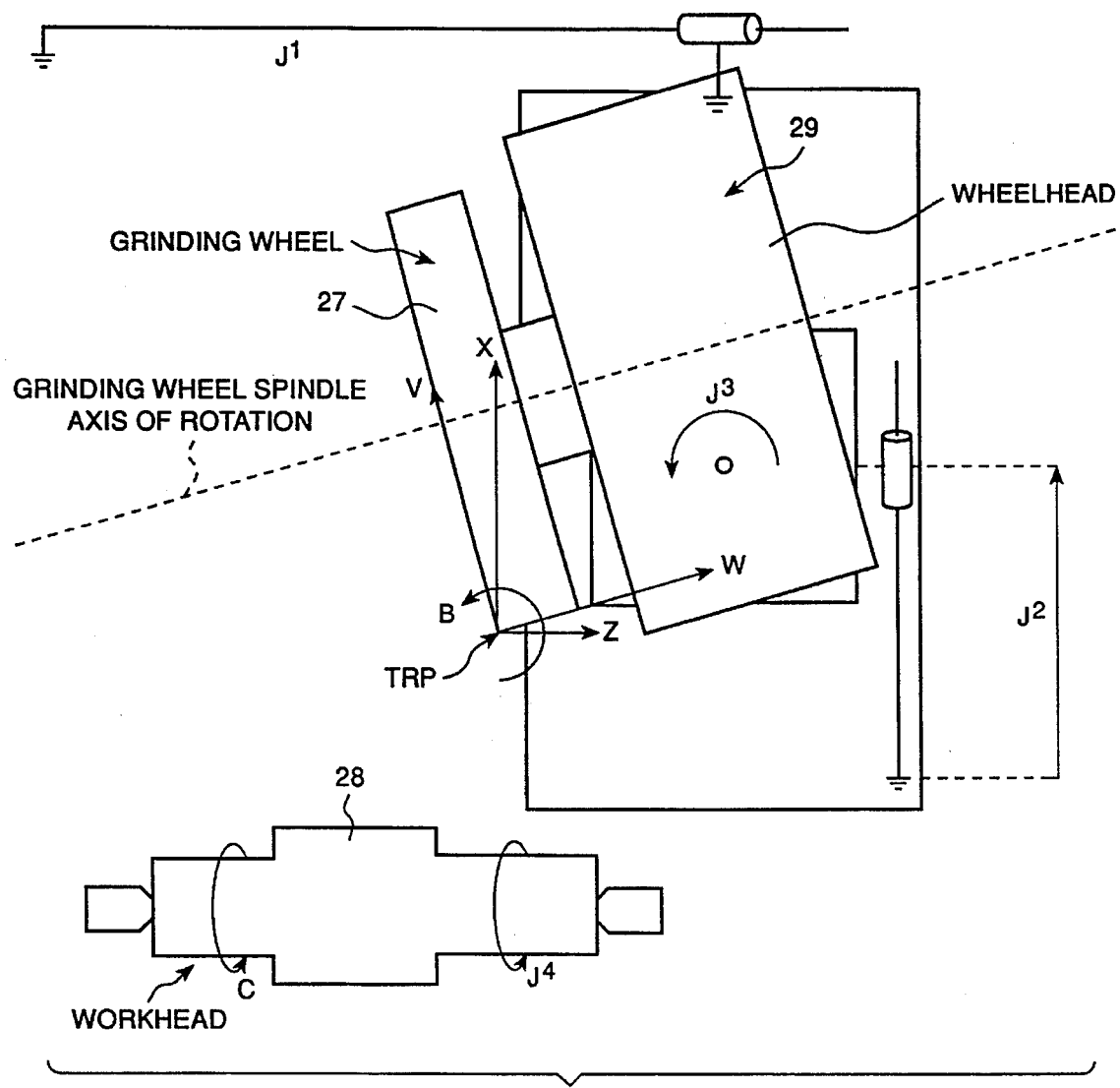
FIG. 6 is a perspective view of the workpiece and grinding wheel of a CNC cylindrical grinder having four principal "hard" axes, two "soft" axes and four joints.

Referring to FIG. 6 of the drawings there is shown a CNC cylindrical grinder having 4 hard axes and 2 soft axes.

In FIG. 6, a grinding wheel 27 is carried by a wheelhead 29 which is linearly movable in the X and Z directions by prismatic joints $J^2$ and $J^1$ respectively. The wheelhead 29 is rotatable about vertical rotary axis B by means of rotary joint $J^3$ and the workhead 28 is rotatable about horizontal rotary axis C by means of rotary joint $J^4$.

The axis layout may be chosen according to the axis selection rules as:

| Hard Axes | |
|---|---|
| X | Linear axis (left/right). |
| Z | Linear axis (fore/aft). |
| B | Rotary axis (vertical rotation of wheelhead) |
| C | Roatary axis (horizontal rotation of workhead) |
| Soft Axes | |
| V | Linear axis (perpendicular to grinding wheel spindle axis of rotation). |
| W | Linear axis (parallel to grinding wheel spindle axis of rotation). |

By the selection and synthesis of soft axes V and W, the machine tool of FIG. 6 can be programmed to control movement of the grinding wheel in the direction of linear axis V or linear axis W. To provide this movement in conventional machine tools would require specific joints.

Figure 7:
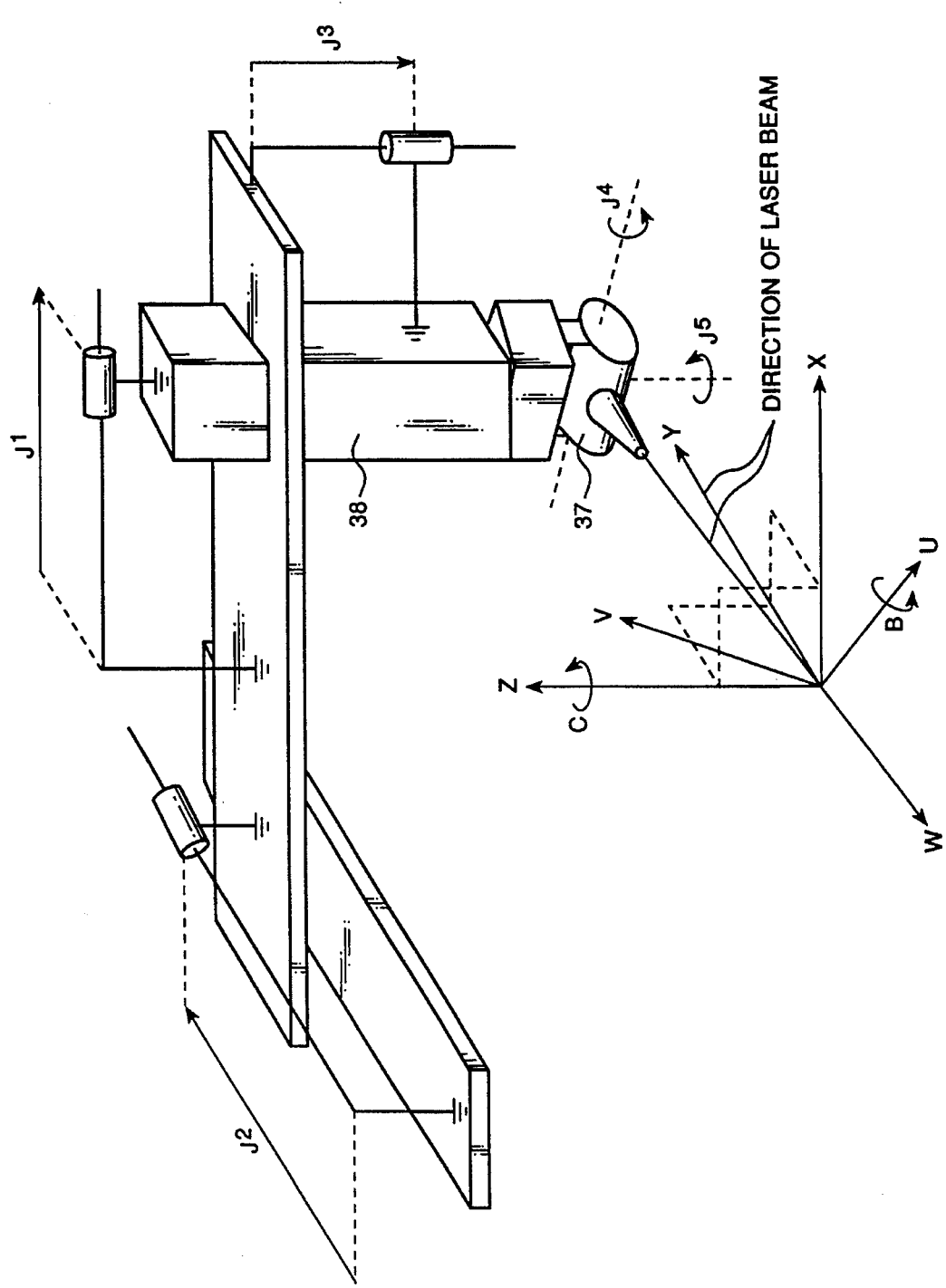
FIG. 7 is a perspective view of the laser cutter of a CNC laser cutting machine tool having five principal "hard" axes, three "soft" axes and five joints.

Referring to FIG. 7, there is shown a CNC laser cutting machine tool having 5 hard axes and 3 soft axes.

The laser cutting machine of FIG. 7 has a laser cutting tool 37 carried by a toolhead 38 which is movable in the directions of three orthogonal axes X, Y and Z by means of prismatic joints $J^1$, $J^2$ and $J^3$ respectively. The laser cutting tool 37 is rotatable about a horizontal rotary axis B by means of rotary joint $J^4$ and rotatable about a vertical rotary axis C by means of rotary joint $J^5$.

The axis layout may be chosen according to the axis selection rules as:

| Hard Axes | |
|---|---|
| X | Linear axis (left/right). |
| Y | Linear axis (fore/aft). |
| Z | Linear axis (up/down). |
| B | Rotary axis (horizontal rotation of laser beam) |
| C | Rotary axis (vertical rotation of laser beam) |
| Soft Axes | |
| U | Linear axis (perpendicular to laser beam direction and Z axis direction) |
| V | Linear axis (perpendicular to laser beam direction and U axis direction) |
| W | Linear axis (parallel to laser beam direction) |

Thus, by the selection and synthesis of soft axes U, V and W, the laser cutting machine tool can be programmed to control movement of the laser cutting tool 37 in the direction of linear axes U, V and W without requiring specific joints for that purpose.

Figure 8:
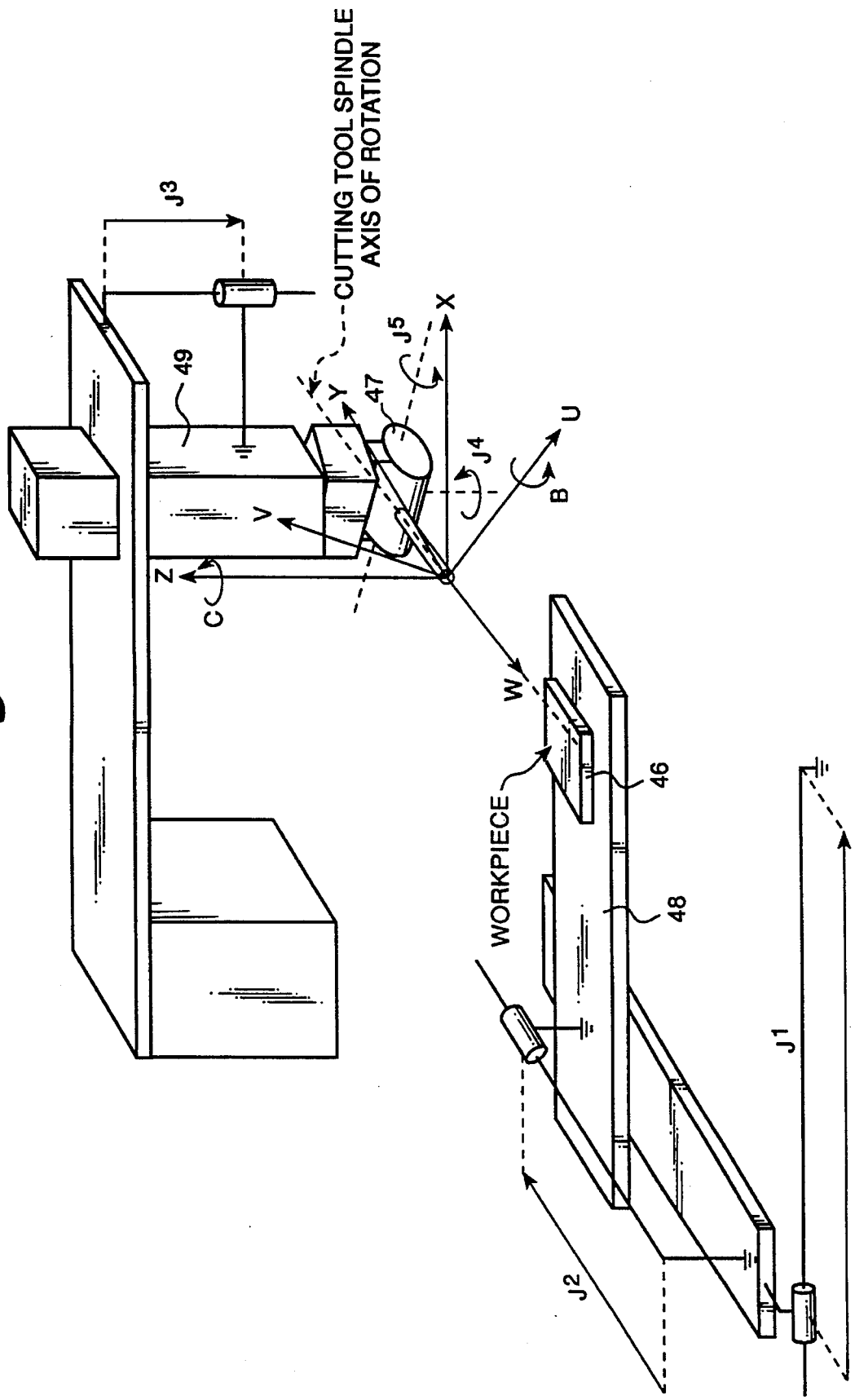
FIG. 8 is a perspective view of the workpiece and cutting tool of a CNC milling machine having five principal "hard" axes, three "soft" axes and five joints.

Referring to FIG. 8, there is shown a CNC milling machine having 5 hard axes and 3 soft axes.

The milling machine of FIG. 8 has a cutting tool 47 carried by a toolhead 49 which is movable in the direction of a vertical axis Z by means of prismatic joint $J^3$. The workpiece 46 is mounted on a workpiece holder 48 which is movable in the directions of horizontal axes X and Y by means of prismatic joints $J^1$ and $J^2$ respectively. The cutting tool is rotatable about a horizontal rotary axis B by means of rotary joint $J^5$ and rotatable about a vertical rotary axis C by means of rotary joint $J^4$.

The axis layout may be chosen according to the axis selection rules as:

| Hard Axes | |
|---|---|
| X | Linear axis (left/right). |
| Y | Linear axis (fore/aft). |
| Z | Linear axis (up/down). |
| B | Rotary axis (horizontal rotation of cutting tool) |
| C | Rotary axis (vertical rotation of cutting tool) |
| Soft Axes | |
| U | Linear axis (perpendicular to cutting tool spindle axis of rotation and Z axis direction) |
| V | Linear axis (perpendicular to cutting tool spindle axis of rotation and U axis direction) |
| W | Linear axis (parallel to cutting tool spindle axis of rotation) |

Once again, by the selection and synthesis of soft axes U, V and W, the cutting tool 47 of the milling machine can be programmed to control movement of the cutting tool 47 in the direction of linear axes U, V and W without requiring specific joints for that purpose.

I claim:

1. A method of operating a multi-axis CNC machine having workpiece mounting means for mounting a workpiece, a cutting tool operable upon said workpiece, a plurality of machine members and a plurality of controllable joint means movable under the control of the machine to cause relative movement between the cutting tool and the workpiece mounting means, said method comprising the steps of programming the machine with a plurality of principal programmable positioning axes which axes constitute the minimum number of axes required to position the cutting tool relative to the workpiece mounting moans, and programming the machine to control movement of the joint means in accordance with a part program so as to cause the cutting tool to move along a programmed path relative to the workpiece mounting the method further comprising the step of programming the machine to synthesize at least one additional concurrently programmable axis whereby relative movement of said cutting tool and said workpiece mounting means is automatically controllable in relation to said additional concurrently programmable axis in accordance with said part program without physical location of said additional concurrently programmable axis by joint means.

2. A method according to claim 1 including the step of programming said at least one synthesized additional concurrently programmable axis to be non-collinear with said principal programmable axes 3. A method according to claim 1 including the step of programming said at least one additional concurrently programmable axis to pass through a part of the cutting tool and to be fixed relative to the cutting tool.

4. A method according to claim 1 including the step of programming the machine to synthesize a plurality of additional concurrently programmable axes, at least one of said synthesized additional concurrently programmable being axes non-collinear with said principal programmable axes.

5. A method according to claim 4 including the step of programming at least one of said synthesized additional concurrently programmable axes to pass through a part of the cutting tool and to be fixed relative to the cutting tool.

6. A method according to claim 1, including the step of programming the machine with a number of programmable axes greater than the number of joint means of the machine.

7. A method of operating of multi-axis CNC machine having workpiece mounting means for mounting a workpiece; a cutting tool operable upon said workpiece, a plurality of machine members and a plurality of controllable joint means movable under the control of the machine to cause relative movement between the cubing tool and the workpiece mounting means, wherein said plurality of joint means include a plurality of linear joints and at least one rotary joint, said method comprising the steps of:

programming the machine with a plurality of programmable linear axes and at least one programmable rotary axis;

programming the machine to control movement of said plurality of joint means relative to said programmable axes so as to cause the cutting tool to move along a programmed pall, said programmable linear and rotary axes including principal programmable axes constituting the minimum number of axes required to position the cutting tool relative to the workpiece mounting means and at least one additional concurrently programmable axis;

and programming the machine to control movement of at least one of said joint means relative to said additional concurrently programmable axis without physical location of said additional concurrently programmable axis by said joint means.

8. A multi-axis computer numerically controlled (CNC) machine tool comprising:

workpiece mounting means for mounting a workpiece thereon;

a cutting tool movable relative to the workpiece mounting means;

a plurality of machine members; and a plurality of controllable joint means movable to cause the relative movement between said cutting tool and said workpiece mounting means; and programmable control means programmed to control automatically the position and orientation of said plurality of joint means in accordance with a part program;

the machine tool having a plurality of principal programmable positioning directions or axes which constitute tho minimum number of programmable axes required to position and orientate the cutting tool relative to the workpiece mounting means;

wherein the machine tool has at least one synthesized additional concurrently programmable axis, and the programmable control means is programmed to control movement of said cutting tool or said workpiece mounting means in relation to said at least one additional concurrently programmable axis in accordance with said pan program without physical location of said at least one synthesized additional programmable axis by said joint means.

9. A multi-axis CNC machine tool according to claim 8 wherein said at least one synthesized additional concurrently programmable axis is non-collinear with said principal programmable axes.

10. A multi-axis machine tool according to claim 9 wherein said at least one synthesized additional programmable axis is arranged to pass through a part of the cutting tool and is fixed relative to the cutting tool.

11. A multi-axis machine tool according to claim 8 wherein the machine is programmed to synthesize a plurality of additional concurrently programmable axes, whereby movement of said cutting tool or said workpiece mounting means in relation to each one of said synthesized additional programmable axes is controllable without physical location of said synthesized additional programmable axes.

12. A multi-axis machine tool according to claim 11, wherein at least one of said plurality of synthesized additional programmable axes is non-collinear with said principal programmable axes.

13. A multi-axis machine tool according to claim 12, wherein at least one of said plurality of synthesized additional programmable axes is arranged to pass through a part of said cutting tool and is fixed relative to the cutting tool.

14. A multi-axis CNC machine tool according to claim 8, wherein the total number of programmable axes is greater than the total number of joint means of the machine.

15. A multi-axis CNC machine tool according to claim 14, wherein the programmable control means is programmed to generate axis position signals, each axis position signal representing a desired position for the cutting tool relative to the workpiece mounting means in terms of components and co-ordinates of the principal programmable axes and synthesized additional concurrent programmable axes, wherein the machine further includes a co-ordinate transform module programmed to transform said axis position signals into joint position signals for controlling the positions of the plurality of joint means so as to cause the cutting tool to occupy the desired position and orientation relative to the workpiece mounting means.

16. A multi-axis CNC machine tool according to claim 15, wherein said programmable axes include linear axis and rotary axes and said plurality of joint means include linear or prismatic joints and rotary joints.

17. A multi-axis CNC machine tool according to claim 16, wherein the machine has at least two prismatic joints providing movement in at least two orthogonal linear axes and at least one rotary joint providing relation about a rotary axis, the machine being programmed with principal programmable axes corresponding to said orthogonal linear axes and said at least one rotary axis, the machine also being programmed to synthesize at least one additional concurrently programmable axis.

18. A multi-axis CNC machine tool according to claim 17, wherein the machine has two prismatic joints providing movement in two orthogonal linear axes and two rotary joints providing rotation about two rotary axes, the machine being programmed with four principal programmable axes respectively corresponding to said orthogonal linear axes and said two rotary axes, the machine being programmed to synthesize two additional concurrently programmable linear axes.

19. A multi-axis CNC machine tool according to claim 18, wherein said two synthesized additional concurrently programmable linear axes are in the same plane as the two principal orthogonal linear axes, said additional concurrently programmable linear axes being non-collinear with said principal linear axes.

20. A multi-axis CNC machine tool according to claim 17, wherein the machine has three prismatic joints providing movement in three orthogonal linear axes and two rotary joints providing rotation about two rotary axes, the machine being programmed with five principal programmable axes respectively corresponding to said three orthogonal linear axes and said two rotary axes, the machine being programmed to synthesize an additional concurrently programmable linear axis and an additional concurrently programmable rotary axis.

21. A multi-axis CNC machine tool according to claim 17, wherein the machine has three prismatic joints providing movement in three orthogonal linear axes and two rotary joints providing rotation about two rotary axes, the machine being programmed with five principal programmable axes respectively corresponding to said orthogonal linear axes and said two rotary axes, the machine being programmed to synthesize three additional concurrently programmable linear axes.

22. A multi-axis CNC machine tool according to claim 21, wherein the three additional concurrently programmable linear axes are orthogonal axes, each of which is non-collinear with respect to the principal orthogonal linear programmable axes.

* * * * *